United States Patent
Ito

(10) Patent No.: US 11,402,204 B2
(45) Date of Patent: Aug. 2, 2022

(54) SURVEYING INSTRUMENT AND SURVEYING SYSTEM

(71) Applicant: TOPCON CORPORATION, Tokyo (JP)

(72) Inventor: Daisuke Ito, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 702 days.

(21) Appl. No.: 16/423,979

(22) Filed: May 28, 2019

(65) Prior Publication Data

US 2019/0368871 A1 Dec. 5, 2019

(30) Foreign Application Priority Data

May 31, 2018 (JP) .............................. JP2018-104471

(51) Int. Cl.
  *G01C 5/02* (2006.01)
  *G10L 15/18* (2013.01)
  *G10L 15/22* (2006.01)

(52) U.S. Cl.
  CPC ................ *G01C 5/02* (2013.01); *G10L 15/18* (2013.01); *G10L 15/22* (2013.01); *G10L 2015/223* (2013.01)

(58) Field of Classification Search
  CPC ....................................................... G01C 5/02
  USPC .......................................................... 33/291
  See application file for complete search history.

(56) References Cited

U.S. PATENT DOCUMENTS

| | | | | |
|---|---|---|---|---|
| 3,771,876 A | * | 11/1973 | Ljungdahl ............ | G01C 15/004 359/833 |
| 4,082,466 A | * | 4/1978 | Underberg ............... | G01C 5/02 33/291 |
| 5,485,266 A | * | 1/1996 | Hirano ................... | G01B 11/26 33/291 |

(Continued)

FOREIGN PATENT DOCUMENTS

| | | |
|---|---|---|
| JP | 2007-225307 A | 9/2007 |
| JP | 2009-204349 A | 9/2009 |

(Continued)

*Primary Examiner* — George B Bennett
(74) *Attorney, Agent, or Firm* — Roberts Calderon Safran & Cole P.C.

(57) ABSTRACT

Provided is a surveying instrument including a measuring unit including a tilt sensor configured to acquire tilt angle data of the instrument, and an environment sensor to acquire environment data correlating with a leveling time and leveling accuracy, a leveling unit including a leveling drive unit and configured to level the instrument, an arithmetic control unit configured to control the measuring unit and the leveling unit, and a storage unit configured to store the environment data, leveling result data of the leveling unit, and information on leveling operation conditions. The storage unit has surveying instrument-specific information. The arithmetic control unit predicts optimum leveling conditions based on results of machine learning of optimum leveling conditions by using the environment data, the leveling result data, the information on leveling operation conditions, and the surveying instrument-specific information as learning data to modify a leveling program so as to realize the optimum leveling conditions.

20 Claims, 10 Drawing Sheets

(56) References Cited

U.S. PATENT DOCUMENTS

| | | | |
|---|---|---|---|
| 7,861,427 B2 * | 1/2011 | Schumacher | G01C 15/004 33/282 |
| 8,087,176 B1 * | 1/2012 | Hayes | G01C 15/004 33/1 G |
| 8,857,069 B2 * | 10/2014 | Adegawa | G01C 9/00 33/291 |
| 8,959,783 B2 * | 2/2015 | Kumagai | G01C 15/002 33/291 |
| 9,605,956 B2 * | 3/2017 | Nishita | G01C 15/002 |
| 9,958,269 B2 * | 5/2018 | Metzler | G06V 20/10 |
| 2007/0195313 A1 | 8/2007 | Haijima et al. | |
| 2012/0133918 A1 | 5/2012 | Sakimura et al. | |
| 2017/0108334 A1 | 4/2017 | Kamiki et al. | |
| 2018/0107947 A1 | 4/2018 | Ogawa | |

FOREIGN PATENT DOCUMENTS

| | | |
|---|---|---|
| JP | 2017-78612 A | 4/2017 |
| JP | 2018-040704 A | 3/2018 |

\* cited by examiner

SURVEYING INSTRUMENT AND SURVEYING SYSTEM

CROSS-REFERENCE TO RELATED APPLICATIONS

The present application claims priority under 35 U.S.C. § 119 to Japanese Patent Application No. 2018-104471 filed May 31, 2018. The contents of this application are incorporated herein by reference in their entirely.

TECHNICAL FIELD

The present invention relates to a surveying instrument, more specifically, to a surveying instrument and a surveying system having an automatic leveling function.

BACKGROUND ART

An apparatus main body of a surveying instrument must be installed horizontally. Therefore, a surveying instrument includes a leveling device (leveling unit), and a tilt sensor to detect a leveled state and horizontality. Conventionally, as described in Patent Literatures 1 and 2, many surveying instruments having an automatic leveling function have been proposed.

As a tilt sensor, a type that detects a tilt angle on the basis of a position of a bubble inside a bubble tube filled with a liquid (refer to Patent Literature 1), and a type that detects a tilt angle by utilizing a free liquid level maintaining horizontality (refer to Patent Literature 2), have been commonly used.

In such a surveying instrument, in order to shorten a time necessary for completion of leveling (hereinafter, referred to as a "leveling time"), for example, Patent Literature 1 proposes that temperature data is acquired at the time of a leveling operation, and a tilt driving time and a tilt driving speed of the surveying instrument main body are adjusted in response to the temperature data.

Patent Literature 2 proposes that the leveling time is shortened by measuring a tilt angle by using an acceleration sensor with higher responsiveness in addition to a tilt sensor using a free liquid level, performing rough leveling based on results of detection of the acceleration sensor, and then performing accurate leveling based on results of detection of the tilt sensor.

CITATION LIST

Patent Literatures

Patent Literature 1: Japanese Published Unexamined Patent Application No. 2007-225307
Patent Literature 2: Japanese Published Unexamined Patent Application No. 2017-078612

SUMMARY OF THE INVENTION

Technical Problem

However, even a surveying instrument improved variously has a problem in which, due to individual installation environments and characteristics unique to the instrument, the leveling time becomes long and the leveling accuracy decreases in some cases.

In this case, it is necessary that an operator finely adjusts leveling operation conditions by his/her professional intuition, or a sales agency or manufacturer recovers the surveying instrument and modifies a leveling program so as to solve individual problems.

The present invention was made in view of the above-described circumstances, and an object of the present invention is to provide a surveying instrument and a surveying system capable of quickly completing automatic leveling with high accuracy.

Solution to Problem

In order to solve the above-described problem, a surveying instrument according to an aspect of the present invention includes a measuring unit including a tilt sensor configured to acquire tilt angle data of a surveying instrument main body, and an environment sensor configured to acquire environment data having a correlation with a leveling time and leveling accuracy, a leveling unit including a leveling drive unit and configured to level the surveying instrument based on the tilt angle data, an arithmetic control unit configured to control the measuring unit and the leveling unit, and a storage unit configured to store the environment data, leveling result data of the leveling unit, and information on leveling operation conditions, wherein the storage unit has surveying instrument-specific information, and the arithmetic control unit includes a leveling condition optimization unit configured to predict optimum leveling conditions according to environment data and the surveying instrument-specific information based on results of machine learning of optimum leveling conditions by using the environment data, the leveling result data, the information on leveling operation conditions, and the surveying instrument-specific information as learning data, and a program modification unit configured to modify a leveling program so as to realize the optimum leveling conditions.

In the aspect described above, it is also preferable that the arithmetic control unit includes an automatic leveling determination unit configured to determine whether the surveying instrument has an automatic leveling function on the basis of the surveying instrument-specific information.

In the aspect described above, it is also preferable that the surveying instrument further includes a voice output unit, the arithmetic control unit includes a reporting and advising unit configured to create a message for an operator, and the voice output unit outputs a message created by the reporting and advising unit by voice.

In the aspect described above, it is also preferable that the arithmetic control unit includes a leveling execution unit configured to execute a leveling operation according to the leveling program, and the reporting and advising unit is configured to report an end of a leveling operation from the voice output unit when leveling is completed by the leveling execution unit.

In the aspect described above, it is also preferable that the surveying instrument further includes a voice input unit configured to input voice, and the arithmetic control unit includes a voice recognition unit configured to recognize the voice input by a natural language processing function.

A surveying system according to another aspect of the present invention includes a surveying instrument according to the above-described aspect further including a communication unit that enables communication externally via a communication network, a server configured to enable communication with the surveying instrument, and at least one first external device having the same configuration as the surveying instrument and enabling communication with the server via the communication network, and the server includes a server storage unit configured to store environment data, leveling result data, and information on leveling operation conditions acquired in the past by the surveying instrument and the first external device, and surveying instrument-specific information, and the leveling condition optimization unit is configured to predict optimum leveling conditions according to environment data acquired by the environment sensor and surveying instrument-specific information received from the server based on results of machine learning of optimum leveling conditions by using environment data, leveling result data, information on leveling operation conditions, and surveying instrument-specific information received from the server, as learning data.

A surveying system according to another aspect of the present invention includes a surveying instrument that includes a measuring unit including a tilt sensor configured to acquire tilt angle data of a surveying instrument main body, and an environment sensor configured to acquire environment data having a correlation with a leveling time and leveling accuracy, a leveling unit including a leveling drive unit and configured to level the surveying instrument based on the tilt angle data, an arithmetic control unit configured to control the measuring unit and the leveling unit, and a communication unit that enables communication externally via a communication network, a server that includes a server communication unit enabling communication with the surveying instrument, a server storage unit configured to receive measurement data from the surveying instrument and store the measurement data, and a server control unit configured to control the server, and at least one first external device having the same configuration as the surveying instrument and enabling communication with the server via the communication network, wherein the arithmetic control unit includes a leveling condition optimization command unit configured to command the server to predict optimum leveling conditions, the server control unit includes a leveling condition optimization unit configured to predict optimum leveling conditions according to environment data and the surveying instrument-specific information based on results of machine learning of optimum leveling conditions by using the environment data, the leveling result data, the information on leveling operation conditions, and the surveying instrument-specific information relating to the surveying instrument and the first external device, stored in the server storage unit, as learning data, and the arithmetic control unit includes a program modification unit configured to modify a leveling program so as to realize the optimum leveling conditions.

In the aspect described above, it is also preferable that the surveying system includes at least one second external device including at least an environment sensor and a communication unit, wherein measured data measured by the second external device is transmitted to the server, the server is configured to sequentially store data received from the second external device in the server storage unit, and the leveling condition optimization unit is configured to use measured data of the second external device as learning data for the machine learning.

Effect of the Invention

According to the configuration described above, a surveying instrument and a surveying system capable of quickly completing automatic leveling with high accuracy can be provided.

DESCRIPTION OF EMBODIMENTS

Preferred embodiments of the present invention are described with reference to the drawings. In the embodiments described below, the same components are provided with the same reference sign, and overlapping description is omitted.

First Embodiment (Configuration of Surveying Instrument)

Figure 1:
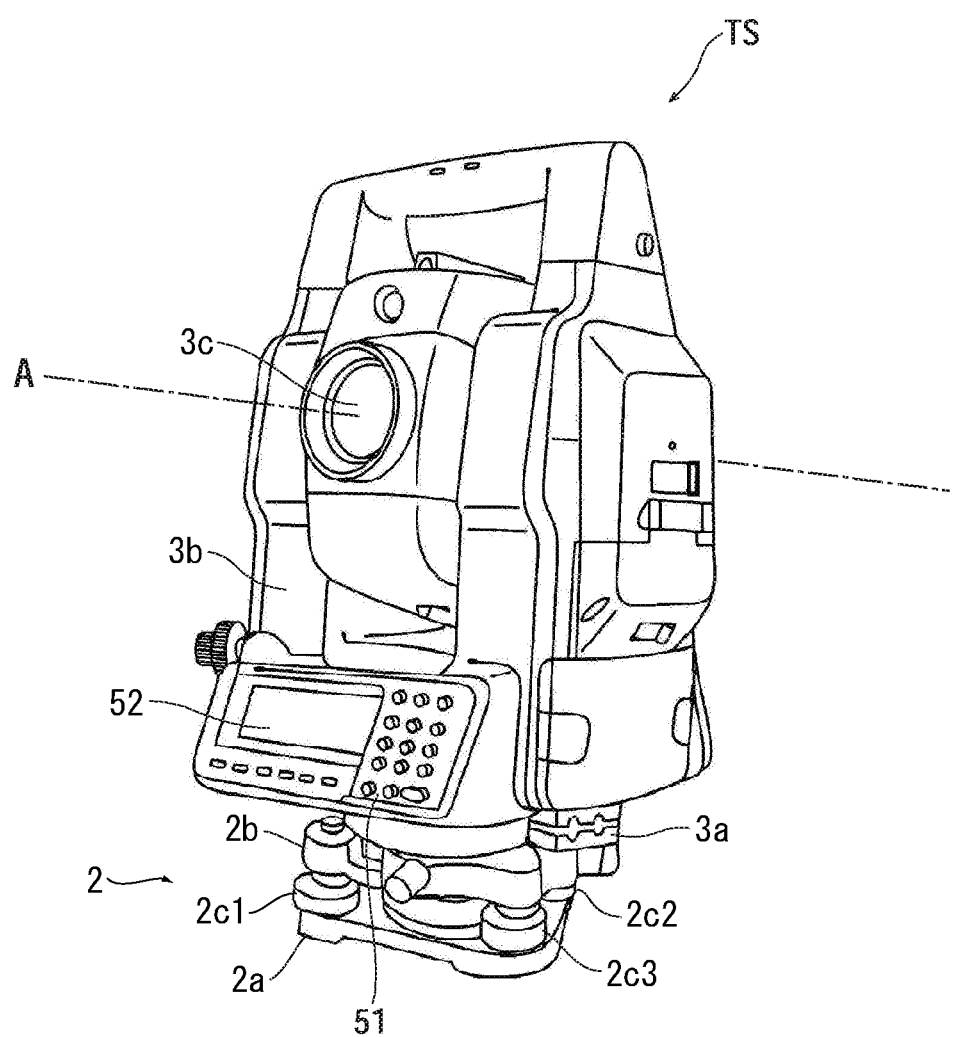
FIG. 1 is a right perspective view of a surveying instrument according to a first embodiment of the present invention.
Figure 2:
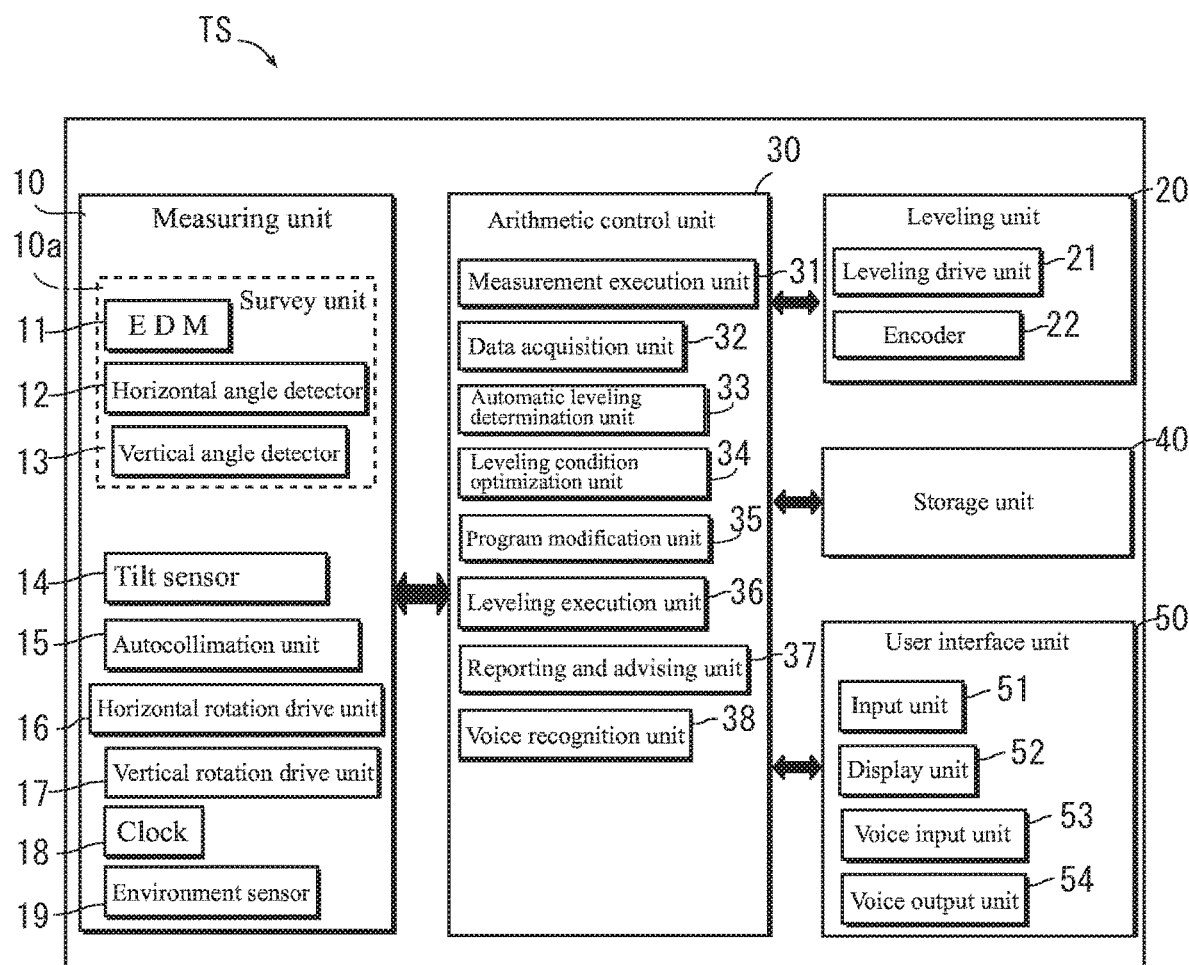
FIG. 2 is a configuration block diagram of the surveying instrument according to the same embodiment.
Figure 3:
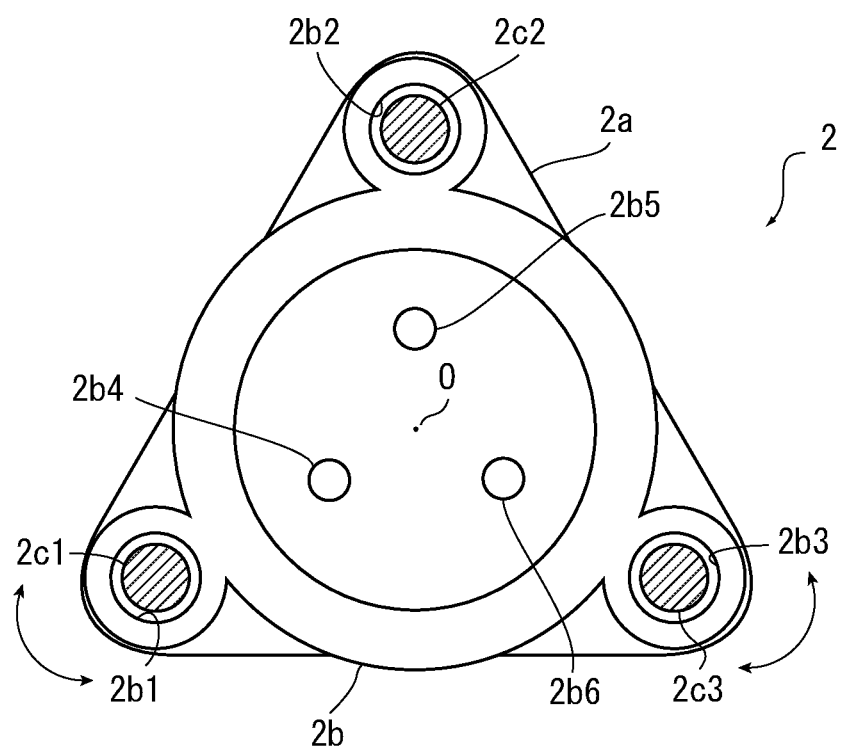
FIG. 3 is a schematic plan view of a leveling apparatus according to the same embodiment.

A surveying instrument TS according to a first embodiment of the present invention is a total station. FIG. 1 is a right perspective view of the surveying instrument TS, FIG. 2 is a configuration block diagram of the surveying instrument TS, and FIG. 3 is a schematic plan view of a leveling apparatus 2.

As illustrated in FIG. 1, the surveying instrument TS includes, in appearance, a substrate portion 3a to be removably joined onto the leveling apparatus 2, a bracket portion 3b capable of rotating horizontally on the substrate portion 3a, and a telescope 3c capable of rotating vertically at the center of the bracket portion 3b. The telescope 3c includes a collimation optical system that is collimated to a target.

The leveling apparatus 2 includes, in appearance, a tripod attaching seat portion 2a for attaching a tripod (not illustrated in the drawings), a leveling apparatus main body 2b, and three leveling screws 2c1, 2c2, and 2c3 that join the tripod attaching seat portion 2a and the leveling apparatus main body 2b. As illustrated in FIG. 3, at an outer peripheral portion of the leveling apparatus main body 2b, leveling screw attaching portions 2b1, 2b2, and 2b3 are provided at three positions so that they become corners of a regular triangle having a center of gravity set on a reference axis O.

At a central portion of the leveling apparatus main body 2b, engagement holes 2b4, 2b5, and 2b6 for attaching the surveying instrument TS main body are provided.

The three leveling screws 2c1, 2c2, and 2c3 are attached to the leveling screw attaching portions 2b1, 2b2, and 2b3 of the leveling apparatus main body 2b. When performing automatic leveling, among the three leveling screws 2c1, 2c2, and 2c3, the leveling screw 2c2 is fixed, and other two leveling screws 2c1 and 2c3 are automatically adjustable, and by adjusting the leveling screws 2c1 and 2c3 by rotating them in the directions of both arrows illustrated in FIG. 3, the surveying instrument TS main body can tilt in an arbitrary direction around the reference axis O.

As illustrated in FIG. 2, the surveying instrument TS functionally includes a measuring unit 10, a leveling unit 20, an arithmetic control unit 30, a storage unit 40, and a user interface unit 50.

The measuring unit 10 includes an EDM (Electro-optical Distance Measuring Instrument) 11, a horizontal angle detector 12, a vertical angle detector 13, a tilt sensor 14, an autocollimation unit 15, a horizontal rotation drive unit 16, a vertical rotation drive unit 17, a clock 18, and an environment sensor 19.

The EDM 11 includes a light emitting element, a distance-measuring optical system, and a light receiving element. The EDM 11 is disposed inside the telescope 3c, and the distance measuring optical system shares optical elements with the collimation optical system. The EDM 11 emits a distance measuring light from the light emitting element, receives a reflected light from a target by the light receiving element, to measure a distance to the target and acquires distance measuring data.

The horizontal angle detector 12 and the vertical angle detector 13 are rotary encoders. The horizontal angle detector 12 and vertical angle detector 13 detect rotation angles respectively around rotation axes of the bracket portion 3b and the telescope 3c respectively driven by the horizontal rotation drive unit 16 and the vertical rotation drive unit 17 described later and respectively obtain a horizontal angle and a vertical angle of a collimation optical axis A, so as to acquire angle measuring data.

As essential portions of the measuring unit 10, the EDM 11, the horizontal angle detector 12, and the vertical angle detector 13 constitute a survey unit 10a.

The tilt sensor 14 is an optical tilt sensor including, for example, an electric bubble tube, a light source, a light receiving element, and a control means, configured to transmit light from the light source through the electric bubble tube, and receive the light by the light receiving element, and based on a light receiving signal from the light receiving element, calculate a tilt angle by the control means, however, the tilt sensor is not limited to this.

The tilt sensor 14 is provided in the surveying instrument TS main body, and acquires tilt angle data of the surveying instrument TS main body.

The autocollimation unit 15 includes a collimation optical system, a collimating light source, and an image sensor, etc. The autocollimation unit 15 performs autocollimation in which a collimation light is output from the collimating light source, a reflected collimation light from a target is received by the image sensor, and based on results of light reception, the collimation optical axis is matched with the target.

The horizontal rotation drive unit 16 and the vertical rotation drive unit 17 are motors, and controlled by a measurement execution unit 31 of the arithmetic control unit 30. The horizontal rotation drive unit 16 rotates the bracket portion 3b horizontally. The vertical rotation drive unit 17 rotates the telescope 3c vertically.

The clock 18 measures a time in measurement in the measuring unit 10 and leveling in the leveling unit 20. For example, the clock measures a motor driving time, a leveling time, etc., of the leveling unit 20.

The environment sensor 19 is a sensor to measure a measuring environment of the surveying instrument TS. The environment sensor 19 acquires environment data having a correlation with a leveling time and leveling accuracy of the surveying instrument TS. As considered in Patent Literature 1, the environment data having a correlation with a leveling time and leveling accuracy is, for example, a temperature, however, without limiting to this, the environment data may include various environment data that influence a leveling time. As the temperature sensor, various temperature sensors having a publicly known configuration can be used, and for example, a thermistor may be used.

The environment sensor 19 may include various sensors such as a humidity sensor, an atmospheric pressure sensor, an air flow meter, and a vibration meter, respectively having publicly known configurations. These sensors may be used alone, or a plurality of sensors may be used in combination.

The leveling unit 20 includes a leveling drive unit 21 and an encoder 22, and is provided inside the leveling apparatus main body 2b. The leveling drive unit 21 is a so-called stepping motor, and connected to each of two leveling screws 2c2 and 2c3 of the three leveling screws 2c1, 2c2, and 2c3 via one each gear transmission mechanism (not illustrated in the drawings). To the leveling drive unit 21, one each encoder 22 is attached.

By rotating the leveling screws 2c2 and 2c3 by the leveling drive unit 21 to adjust the height, the surveying instrument TS can tilt in an arbitrary direction. A driving speed (the number of rotations), a driving time, and a standby time, etc., of the leveling drive unit 21 are monitored as information relating to leveling operation conditions by the arithmetic control unit 30, and sequentially stored in the storage unit 40.

The arithmetic control unit 30 includes a CPU (Central Processing Unit), a GPU (Graphical Processing Unit), a nonvolatile memory such as a ROM (Read-Only Memory) and a Flash ROM. The arithmetic control unit 30 executes various processings based on various data, information, and instructions input from the measuring unit 10 and the user interface unit 50.

The arithmetic control unit 30 includes, as functional units, a measurement execution unit 31, a data acquisition unit 32, an automatic leveling determination unit 33, a leveling condition optimization unit 34, a program modification unit 35, a leveling execution unit 36, a reporting and advising unit 37, and a voice recognition unit 38.

The measurement execution unit 31 controls the survey unit 10a to perform a measurement according to a survey program, and sequentially stores acquired data in the storage unit 40. In addition, the measurement execution unit 31 acquires data by the tilt sensor 14, the clock 18, and the environment sensor 19 of the measuring unit 10, and sequentially stores acquired data in the storage unit 40.

The data acquisition unit 32 acquires data necessary for machine learning of the leveling condition optimization unit 34. In detail, the data acquisition unit 32 acquires environment data having a correlation with a leveling time and leveling accuracy from the environment sensor 19.

In addition, in a leveling operation, the data acquisition unit 32 continuously acquires a driving speed (the number of rotations), a driving time, and a standby time, etc., of the leveling drive unit 21 by the encoder 22, and sequentially stores them in the storage unit 40.

The automatic leveling determination unit 33 determines whether to perform automatic leveling based on instrument-specific information stored in the storage unit 40. Here, the instrument-specific information is information on the surveying instrument TS, including a model name (model number) and a manufacturing year, etc.

The leveling condition optimization unit 34 performs machine learning about leveling conditions that realize a shortest leveling time and highest leveling accuracy (in the specification, referred to as "optimum leveling conditions") by using the instrument-specific information, the environment data, tilt angle data, leveling result data, and information on leveling operation conditions stored in the storage unit 40 as learning data, and creates a learning model relating to the optimum leveling conditions.

Here, the leveling result data is data including a time necessary for completion of leveling (hereinafter, referred to as "leveling time") and leveling accuracy data. The leveling operation conditions include a driving speed (the number of rotations), a driving time, and a standby time of the leveling drive unit 21, and a tilting direction of the surveying instrument TS, etc.

The leveling condition optimization unit 34 predicts optimum leveling conditions by using the learning model created based on results of machine learning of optimum leveling conditions by using the instrument-specific information, the environment data, the tilt angle data, and the leveling result data as learning data.

The program modification unit 35 modifies the leveling program so as to realize the optimum leveling conditions predicted by the leveling condition optimization unit 34.

The leveling execution unit 36 executes a leveling operation by driving the leveling drive unit 21 according to the leveling program.

The reporting and advising unit 37 creates a reporting and advising message for an operator, and outputs it to the voice output unit 54. For example, a reporting and advising message about results of determination of the automatic leveling determination unit 33, and a reporting and advising message about completion of leveling of the leveling execution unit 36 are created.

The voice recognition unit 38 recognizes voice input from the voice input unit 53 by a natural language processing function, and converts the voice into text information and outputs the text information to the measurement execution unit 31.

The leveling condition optimization unit 34 and the voice recognition unit 38 are configured as software to be controlled by artificial intelligence. Other functional units may be configured as software to be controlled by artificial intelligence, or may be configured by dedicated arithmetic circuits. In addition, functional units configured as software and functional units configured by dedicated arithmetic circuits may be mixed.

The storage unit 40 is, for example, a RAM (Random Access Memory).

The storage unit 40 stores programs for executing functions of the respective functional units. In addition, the storage unit 40 stores data and information acquired by the measuring unit 10 and the leveling unit 20 according to instructions of the arithmetic control unit 30. Further, the storage unit 40 stores instrument-specific information.

The user interface unit 50 includes an input unit 51, a display unit 52, the voice input unit 53, and the voice output unit 54.

The input unit 51 is, for example, an operation button, and with the input unit, an operator can input a command and select settings.

The display unit 52 is, for example, a liquid crystal display. The display unit 52 displays various information such as measurement results, environment information, and setting information in response to commands of the arithmetic control unit 30. In addition, the display unit 52 displays a command input by an operator from the input unit 51.

The input unit 51 and the display unit 52 may be integrally configured as a touch-panel type display.

The voice input unit 53 and the voice output unit 54 are respectively a microphone and a speaker. The voice input unit 53 collects voice produced by an operator, and converts the voice into a voice signal and outputs it. The voice output unit 54 outputs a report and an advice for an operator, generated by the reporting and advising unit 37, as voice based on an instruction of the arithmetic control unit 30.

The voice recognition unit 38 recognizes voice input from the voice input unit 53 by a natural language processing function, and converts the voice into a text command.

(Automatic Leveling Condition Optimization)

Figure 4:
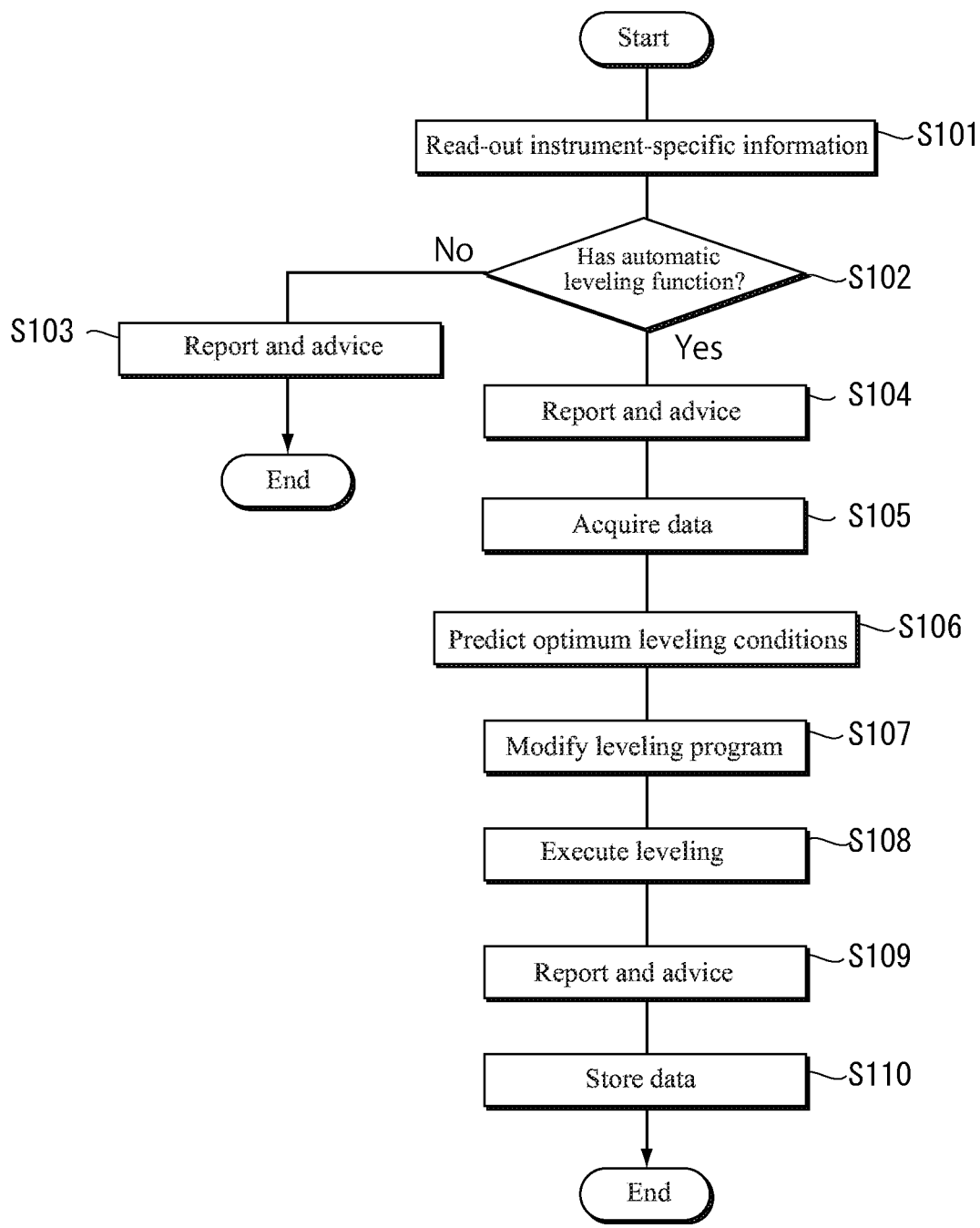
FIG. 4 is a flowchart of automatic leveling condition optimization using the surveying apparatus of the same embodiment.

FIG. 4 is a flowchart of automatic leveling condition optimization using the surveying instrument TS. When an operator turns on the surveying instrument TS, in Step S101, the data acquisition unit 32 reads-out instrument-specific information stored in the storage unit 40.

Next, in Step S102, the automatic leveling determination unit 33 determines whether the surveying instrument TS has an automatic leveling function based on the instrument-specific information.

When the surveying instrument TS does not have an automatic leveling function (No), in Step S103, the reporting and advising unit 37 creates a message according to determination made by the automatic leveling determination unit 33, and outputs the message to the voice output unit 54. The voice output unit 54 outputs the message to the operator U by voice. Then, the processing ends.

Figure 5A:
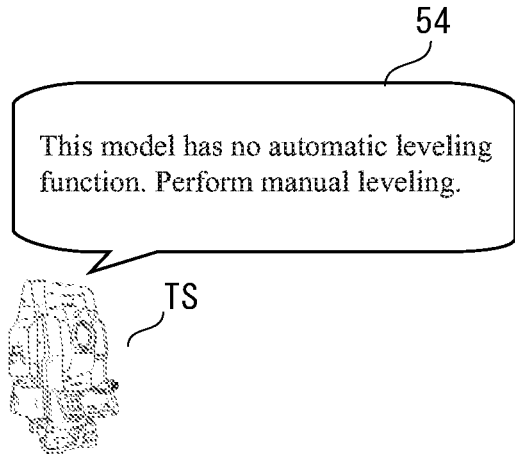
FIG. 5A to FIG. 5C are diagrams illustrating voice communications between the surveying instrument according to the same embodiment and an operator.

FIG. 5 illustrates an example of a message to be output by the voice output unit 54. As illustrated in FIG. 5A, "This model has no automatic leveling function. Perform manual leveling." is output.

Figure 5B:
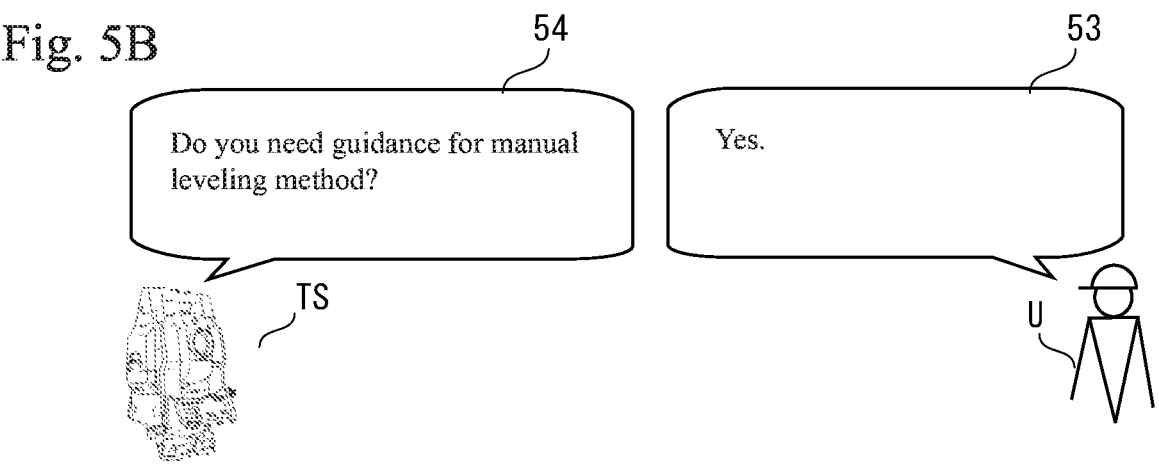

Further, a configuration is possible in which, as illustrated in FIG. 5B, a confirmation message "Do you need guidance for manual leveling method?" is output, and to this question, when the operator U instructs "Yes," "No," etc., by voice from the voice input unit 53, the advising and reporting unit 37 creates messages that sequentially explain a manual leveling method by voice, and output the messages from the voice output unit 54. In this case, the operator U performs manual leveling according to voice output from the voice output unit 54. When the voice guidance ends, the surveying instrument TS ends the leveling operation.

On the other hand, in Step S102, when the surveying instrument is determined to have an automatic leveling function (Yes), the processing shifts to Step S104, and the reporting and advising unit 37 creates a message based on the determination made by the automatic leveling determination unit 33, and outputs, for example, "Automatic leveling starts." from the voice output unit 54, and the processing shifts to Step S105.

Figure 5C:
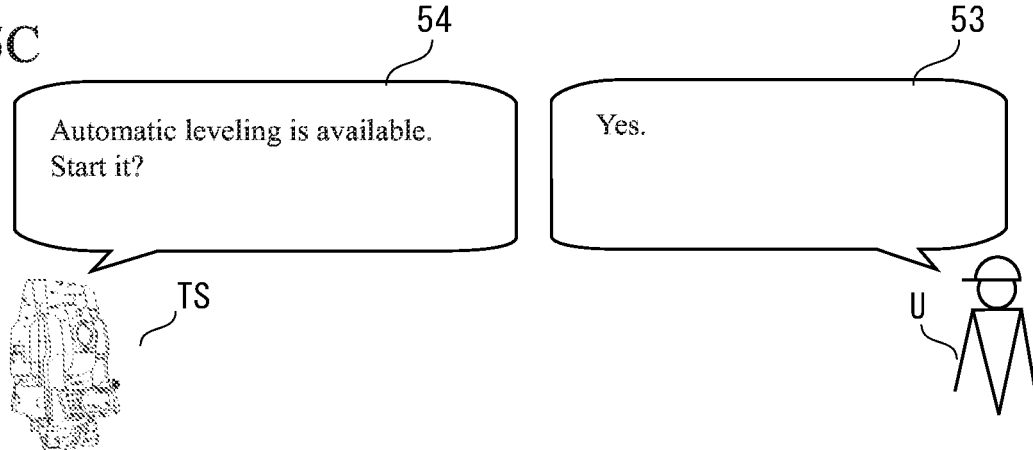

Alternatively, as illustrated in FIG. 5C, it is also possible that a confirmation message "Automatic leveling is available. Start it?" is output from the surveying instrument TS to the operator U, and according to a voice instruction of the operator U, the processing shifts to Step S105.

In Step S105, the data acquisition unit 32 acquires environment data by the environment sensor 19.

Next, when the processing shifts to Step S106, the leveling condition optimization unit 34 predicts optimum leveling conditions according to the instrument-specific information read-out in Step S101, and measured data of environment data having a correlation with a leveling time and leveling accuracy, acquired in Step S105, from the leveling condition learning model created based on results of learning of optimum leveling conditions by using the instrument-specific information, and environment data, tilt angle data, leveling result data, and information on leveling operation conditions acquired in the past (hereinafter, referred to as "past data"), stored in the storage unit 40, as learning data.

Here, the leveling conditions include, for example, a driving speed, a driving time, and a standby time of the leveling drive unit, and a tilting direction (leveling screws to be driven) and a tilt angle of the surveying instrument main body.

Next, in Step S107, the program modification unit 35 modifies the program so that a leveling operation can be executed according to the optimum leveling conditions predicted in Step S106, and stores the modified program in the storage unit 40.

Next, in Step S108, the leveling execution unit 36 executes a leveling operation according to the program modified in Step S107.

Figure 6:
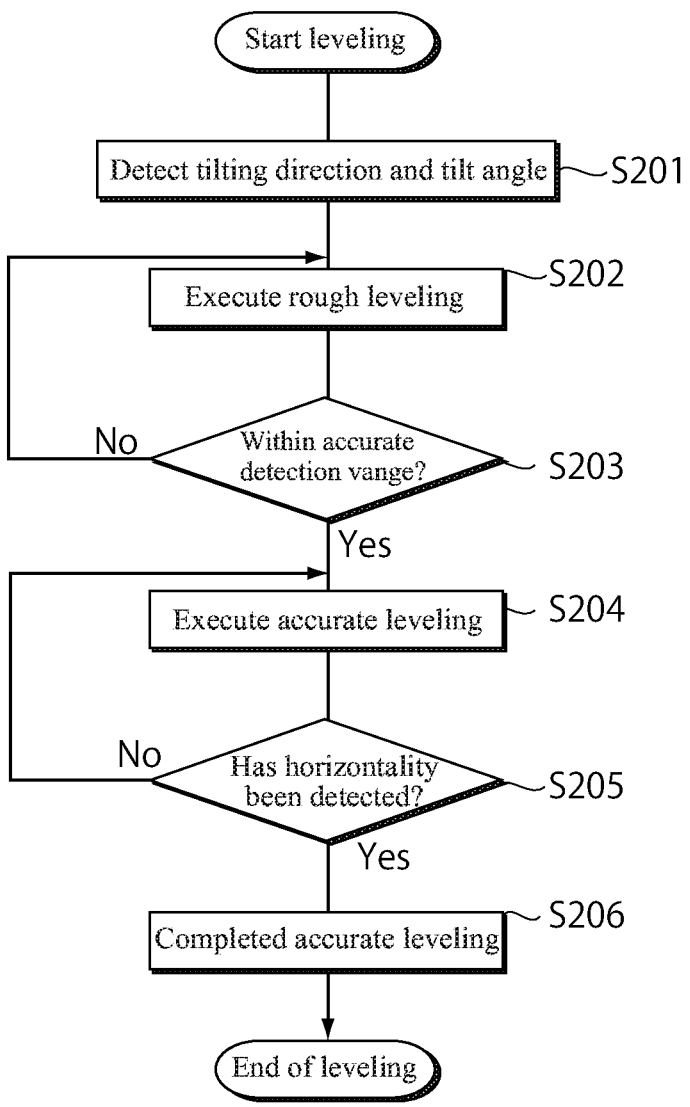
FIG. 6 is a flowchart of an automatic leveling operation using the surveying instrument of the same embodiment.

FIG. 6 is a flowchart of a leveling operation to be executed as a subroutine in Step S107. When a leveling operation starts, in Step S201, the leveling execution unit 36 acquires tilting direction data and tilt angle data by the tilt sensor 14.

Next, in Step S202, the leveling execution unit 36 adjusts the leveling screws 2c1 and 2c3 by driving the leveling drive unit 21 at a comparatively high speed while monitoring a value of the tilt sensor 14, to perform rough leveling so that the surveying instrument TS main body approaches horizontality.

Next, in Step S203, whether the value of the tilt sensor 14 is within an accurate detection range (for example, ±3') is determined.

When the value of the tilt sensor 14 is not within the accurate detection range (No), the processing returns to Step S202, rough leveling is performed again, and the processings of Steps S202 and S203 are repeated until the value of the tilt sensor 14 falls within the accurate detection range.

Then, in Step S203, when the value of the tilt sensor 14 falls within the accurate detection range (Yes), the processing shifts to Step S204, and the leveling execution unit 36 adjusts the leveling screws 2c1 and 2c3 by driving the leveling drive unit 21 at a comparatively low speed while monitoring the value of the tilt sensor 14, to perform accurate leveling so that the surveying instrument TS main body further approaches horizontality.

Then, in Step S205, the leveling execution unit 36 determines whether horizontality (for example, within ±1") has been detected from the value of the tilt sensor 14.

When horizontality is not detected (No), the processing returns to Step S204, accurate leveling is performed again, and the processings of Steps S204 and S205 are repeated until horizontality is detected from the value of the tilt sensor 14.

Then, in Step S205, when the leveling execution unit 36 detects horizontality from the value of the tilt sensor 14 (Yes), in Step S206, accurate leveling is completed, and the leveling operation ends.

When the leveling operation is completed, the processing shifts to Step S109 (FIG. 4), and the reporting and advising unit 37 creates a message to notify completion of leveling, and the voice output unit 54 outputs this message by voice.

Next, in Step S110, environment data, tilt angle data, leveling result data, and information on leveling operation conditions obtained in Step S102 are stored as data of this time in the storage unit 50, and the processing ends. The stored data of this time are used as past data in the next and subsequent leveling condition optimizations.

With the surveying instrument according to the present embodiment, a learning model relating to optimum leveling conditions can be created based on results of machine learning by using at least instrument-specific information, environment data, tilt angle data, leveling result data, and information on leveling operation conditions as learning data, optimum leveling conditions can be predicted according to a measurement environment and measurement conditions based on the learning model, and leveling can be performed according to the optimum leveling conditions, so that quick and highly accurate leveling is enabled without manual program modification and fine setting adjustments.

In particular, a leveling time and leveling accuracy depend on a response speed and stability of the tilt sensor. The response speed and stability of the tilt sensor depends on viscosity of a liquid sealed within the tilt sensor, and viscosity of the liquid depends on temperature. Therefore, in the surveying instrument according to the present embodiment, environment data including at least temperature data is used as learning data, optimum leveling conditions according to the environment data can be predicted, so that shortening of the leveling time and improvement in accuracy are effectively realized.

In particular, instrument-specific information is used as learning data, so that optimum leveling conditions according to characteristics that differ among models of the surveying instruments TS can be set.

With the surveying instrument TS according to the present embodiment, the automatic leveling determination unit 33 determines whether to perform automatic leveling based on instrument-specific information, and reports results of the determination to an operator, so that even a beginner who is not familiar with the functions of the surveying instrument TS can easily grasp whether to perform automatic leveling or whether manual leveling is needed.

With the surveying instrument TS according to the present embodiment, based on results of determination by the automatic leveling determination unit 33, the reporting and advising unit 37 creates a reporting and advising message, and outputs the message by voice from the voice output unit 54. In addition, a predetermined operation is performed based on a command input by voice by an operator from the voice input unit 53.

In this way, a report or advice from the surveying instrument TS can be recognized by voice, and a command from an operator can be issued by voice, so that an operation can be performed without checking a display of the surveying instrument TS. In addition, an operator can operate the surveying instrument TS while performing another operation, so that convenience in use of the surveying instrument TS is improved.

Further, with the surveying instrument TS according to the present embodiment, even when it does not have an automatic leveling function, manual leveling steps are guided by voice, so that an operator can perform a necessary operation according to a voice message output from the surveying instrument TS, and therefore, even an operator who does not have advanced knowledge about the instrument can easily perform a leveling operation.

In addition, in a conventional surveying instrument TS, even if it had an automatic leveling function, it was difficult to know when a leveling operation was completed. However, with the surveying instrument TS according to the present embodiment, when a leveling operation is completed, an operator is notified of completion by voice, so that even if an operator is a beginner who is not familiar with the operation, the operator can smoothly advance to the next operation, so that efficiency of the entire operations is improved.

Second Embodiment (Configuration of Entire System)

Figure 7:
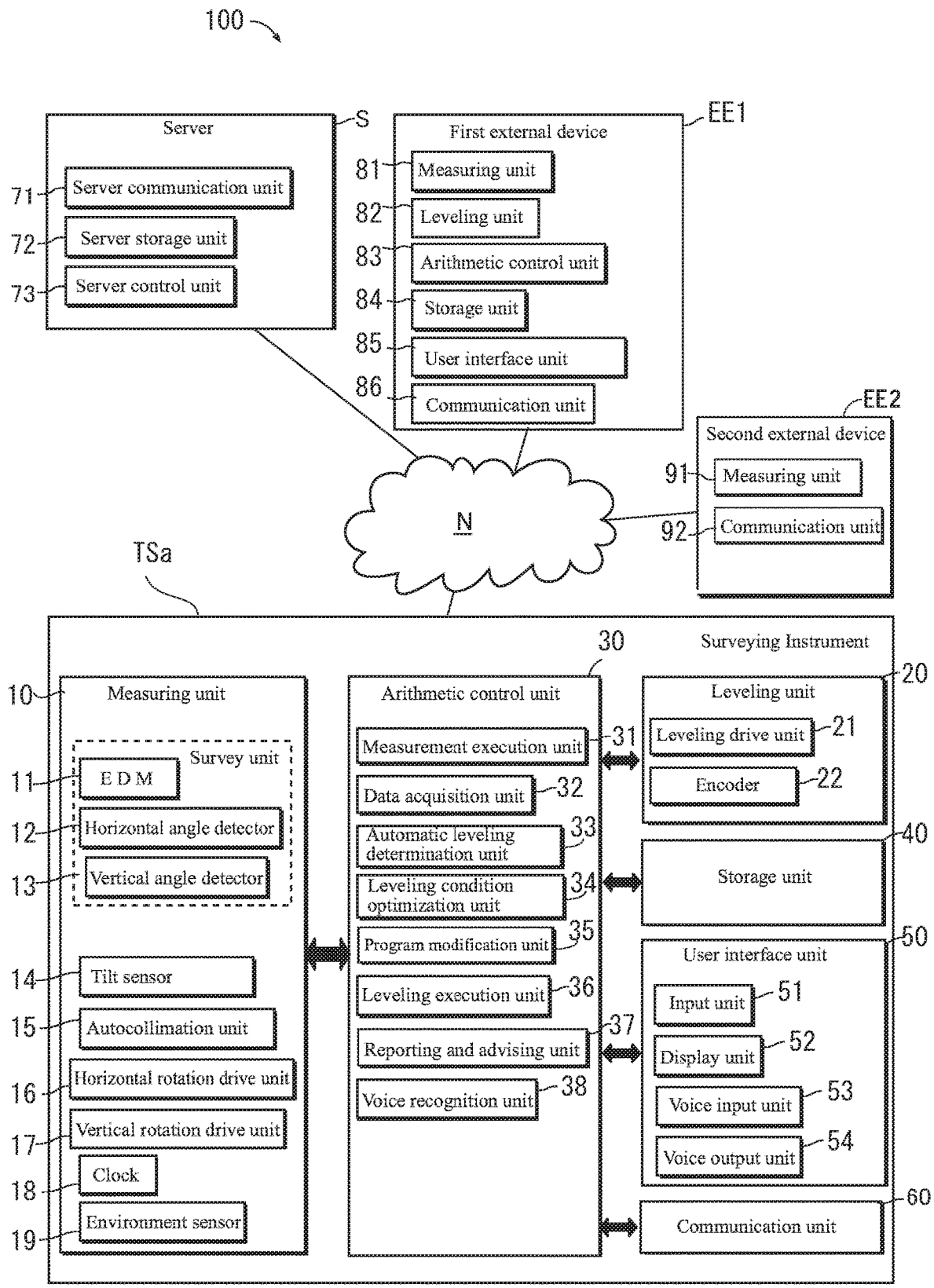
FIG. 7 is a configuration block diagram of a surveying system according to a second embodiment of the present invention.

FIG. 7 is a configuration block diagram of a surveying system (hereinafter, referred to as "system," simply) 100 according to a second embodiment of the present invention.

The system 100 includes a surveying instrument TSa, a server S, a first external device EE1, and a second external device EE2. The surveying instrument TSa, the first external device EE1, and the second external device EE2 are configured to enable communication with the server S via a communication network N.

As the communication network N, the Internet, a local area network, a wide area network, a satellite communication network, etc., can be applied, and these may be compositely combined. The communication network N may be a wired communication network using a cable or a wireless communication network consisting of Wi-Fi, etc.

(Configuration of Surveying Instrument TSa)

The surveying instrument TSa is a surveying instrument having substantially the same configuration as the surveying instrument TS according to the first embodiment. However, the surveying instrument TSa is different in that it includes a communication unit 60.

The communication unit 60 enables communication with the server S and the external devices EE1 and EE2 via the communication network N, and, for example, is connectable to the Internet by using Internet Protocol (TCP/IP).

The surveying instrument TSa transmits data acquired in the measuring unit 10 and the leveling unit 20, leveling result data, and information on leveling conditions to the server S via the communication unit 60 according to an instruction of the arithmetic control unit 30.

(Configuration of Server S)

The server S includes a server communication unit 71, a server storage unit 72, and a server control unit 73.

The server communication unit 71 enables transmission and reception of information between the server S and the surveying instrument TSa, the first external device EE1, and the second external device EE2 via the communication network N.

As the server storage unit 72, for example, an HDD, a solid-state drive, a semiconductor flash memory, and a Blu-ray Disc, etc., can be used. The server storage unit 72 stores various data received from the surveying instrument TSa, the first external device EE1, and the second external device EE2 in association with the respective identification numbers of the surveying instrument TSa, the first external device EE1, and the second external device EE2. The server storage unit 72 also stores instrument-specific information of the surveying instrument TSa, the first external device EE1, and the second external device EE2 in association with their identification numbers, respectively.

The server control unit 73 is a control unit including at least a high-performance CPU and memory (ROM, RAM, etc.). The server control unit 73 transmits data relating to the surveying instrument TSa, the first external device EE1, and the second external device EE2, stored in the server storage unit 72, upon request from the surveying instrument TSa.

(Configuration of First External Device EE1)

The first external device EE1 is a total station of the same type as the surveying instrument TSa. The first external device EE1 includes a measuring unit 81, a leveling unit 82, an arithmetic control unit 83, a storage unit 84, a user interface unit 85, and a communication unit 86. These are respectively the same as the measuring unit 10, the leveling unit 20, the arithmetic control unit 30, the storage unit 40, the user interface unit 50, and the communication unit 60 of the surveying instrument TS, so that descriptions thereof are omitted.

The first external device EE1 transmits data and information acquired by the measuring unit 81 and the leveling unit 82 to the server via the communication unit 86 according to an instruction of the arithmetic control unit 83.

(Configuration of Second External Device EE2)

The second external device EE2 is a measuring instrument of a different kind from the surveying instrument TSa. For example, it is an air speedometer, an air flow meter, a temperature meter, a humidity meter, a vibration meter, or other measuring devices. The second external device EE2 may be a surveying instrument such as a total station, an electronic level, and a transit, different in configuration from the surveying instrument TS, and includes at least a measuring unit 91 and a communication unit 92.

The measuring unit 91 has a publicly known configuration according to the kind of the second external device.

The communication unit 92 enables transmission and reception of data to and from the server S via a communication network N. The second external device EE2 transmits data on measurement and information relating to a usage state to the server S in the same manner as the first external device EE1. This data and information transmission to the server S may be performed for each measurement, or may be collectively performed as appropriate.

(Automatic Leveling Condition Optimization)

Figure 8:
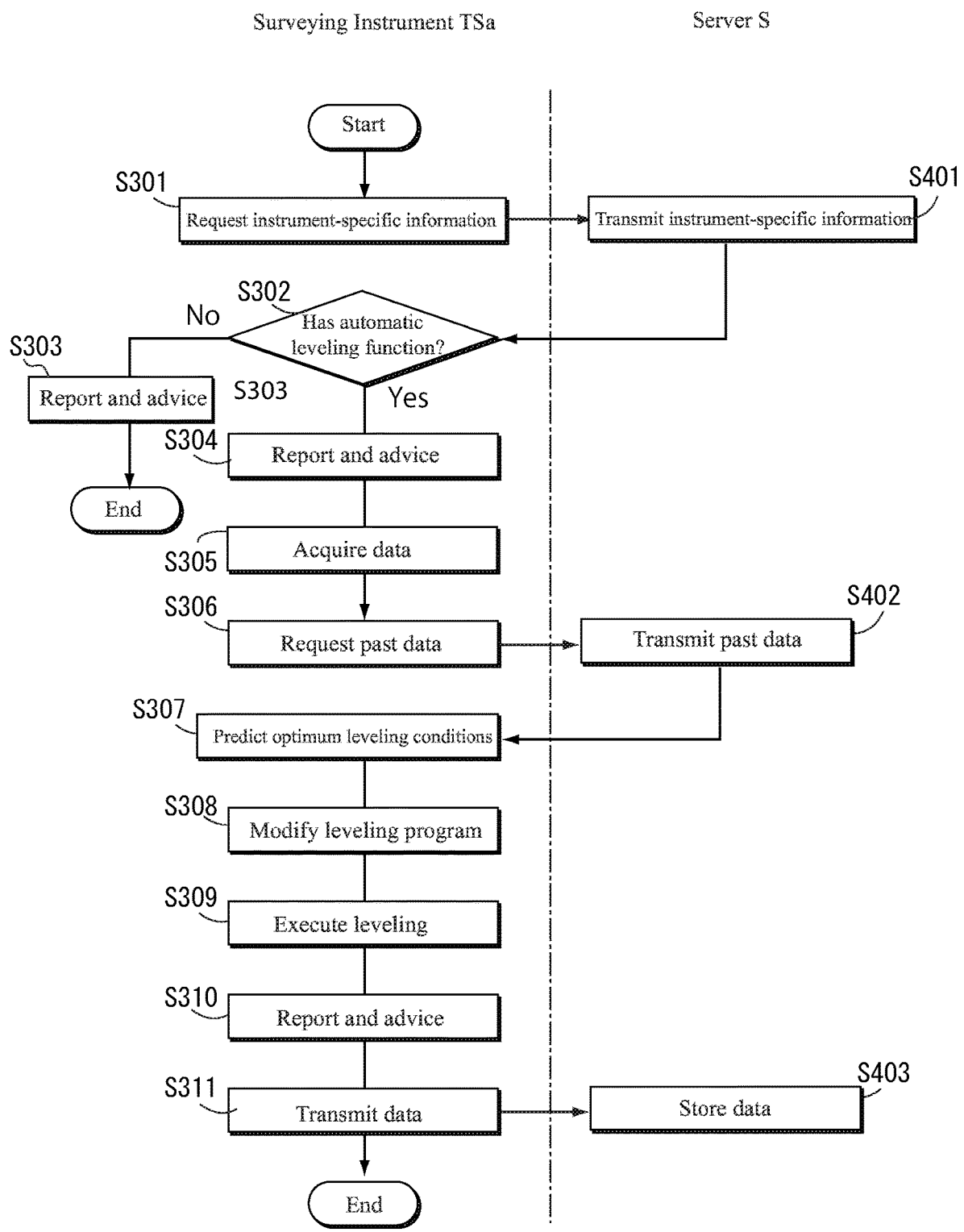
FIG. 8 is a flowchart of program automatic modification processing in the surveying system of the same embodiment.

FIG. 8 is a flowchart of automatic leveling condition optimization processing using the system 100.

The surveying instrument TSa transmits environment data, tilt angle data, leveling result data, and information on leveling operation conditions to the server S for each leveling operation. The server S stores these data as past data in association with the surveying instrument TSa in the server storage unit 72. Similarly, the first external device EE1 also transmits environment data, tilt angle data, leveling result data, and information on leveling operation conditions to the server S for each leveling operation, and the server S stores these data in association with the first external device EE1 in the server storage unit 72. The second external device EE2 also operates in the same manner.

When an operator U turns on the surveying instrument TSa, in Step S301, the data acquisition unit 32 requests the server S to transmit instrument-specific information of the surveying instrument TSa. In Step S401, the server S transmits the requested instrument-specific information to the surveying instrument TSa.

Next, in Step S302, as in Step S102, the automatic leveling determination unit 33 determines whether the surveying instrument TSa has an automatic leveling function based on the instrument-specific information.

When the apparatus does not have an automatic leveling function (No), in Step S303, the reporting and advising unit 37 creates a message based on the determination made by the automatic leveling determination unit 33, and outputs the message to the voice output unit 54. The voice output unit 54 outputs the message to the operator U by voice. Then, the processing ends.

On the other hand, in Step S302, when the apparatus is determined to have an automatic leveling function (Yes), the processing shifts to Step S304, and as in Step S104, the reporting and advising unit 37 creates a message based on the determination made by the automatic leveling determination unit 33, and outputs, for example, "Automatic leveling starts." from the voice output unit 54, and the processing shifts to Step S305.

In Step S305, the data acquisition unit 305 acquires environment data as measured data by the environment sensor 19.

Next, when the processing shifts to Step S306, the leveling condition optimization unit 34 requests, from the server S, environment data, tilt angle data, leveling result data, and information on leveling operation conditions acquired in the past in the surveying instrument TSa, the first external device EE1, and the second external device EE2 (hereinafter, referred to as "past data"), stored in the server storage unit 72. Then, in Step S402, the server S transmits the past data to the surveying instrument TSa.

Next, in Step S307, the leveling condition optimization unit 34 learns optimum leveling conditions by using instrument-specific information acquired in Step S301 and past data received from the server S, and by using a learning model of optimum leveling conditions generated based on learning results, predicts optimum leveling conditions according to the measured data acquired in Step S305 and the instrument-specific information received from the server S.

Next, in Step S308, the program modification unit 35 modifies the program so that leveling can be performed according to optimum leveling conditions predicted in Step S307, and stores the modified program in the storage unit.

Next, in Step S309, the leveling execution unit 36 executes a leveling operation according to the program modified in Step S308. The flowchart of the leveling operation is the same as in the first embodiment.

When the leveling operation is completed, in Step S310, the reporting and advising unit 37 creates a message notifying that leveling has been completed, and the voice output unit 54 outputs this message by voice.

Next, in Step S311, the environment data acquired in Step S305 and leveling result data and information on leveling operation conditions in the leveling operation in Step S309 are transmitted as data of this time to the server S, and the processing ends.

In Step S403, the server S stores data of this time, received from the surveying instrument TSa, in the server storage unit 72. Data of this time is used as past data from the next and subsequent times.

According to the present embodiment, past data not only of the surveying instrument TSa but also of the first external device EE1 and the second external device EE2 are used as learning data, so that learning accuracy is improved, and this is advantageous.

In the example of FIG. 7, the first external device EE1 and the second external device EE2 are provided one each, however, provision of only the first eternal device EE1 is also sufficiently effective. However, without limiting to this, if a plurality of first external devices EE1 and second external devices EE2 are provided, data to be used as a base of learning increases, and this is advantageous.

Third Embodiment (Configuration of Entire System)

Figure 9:
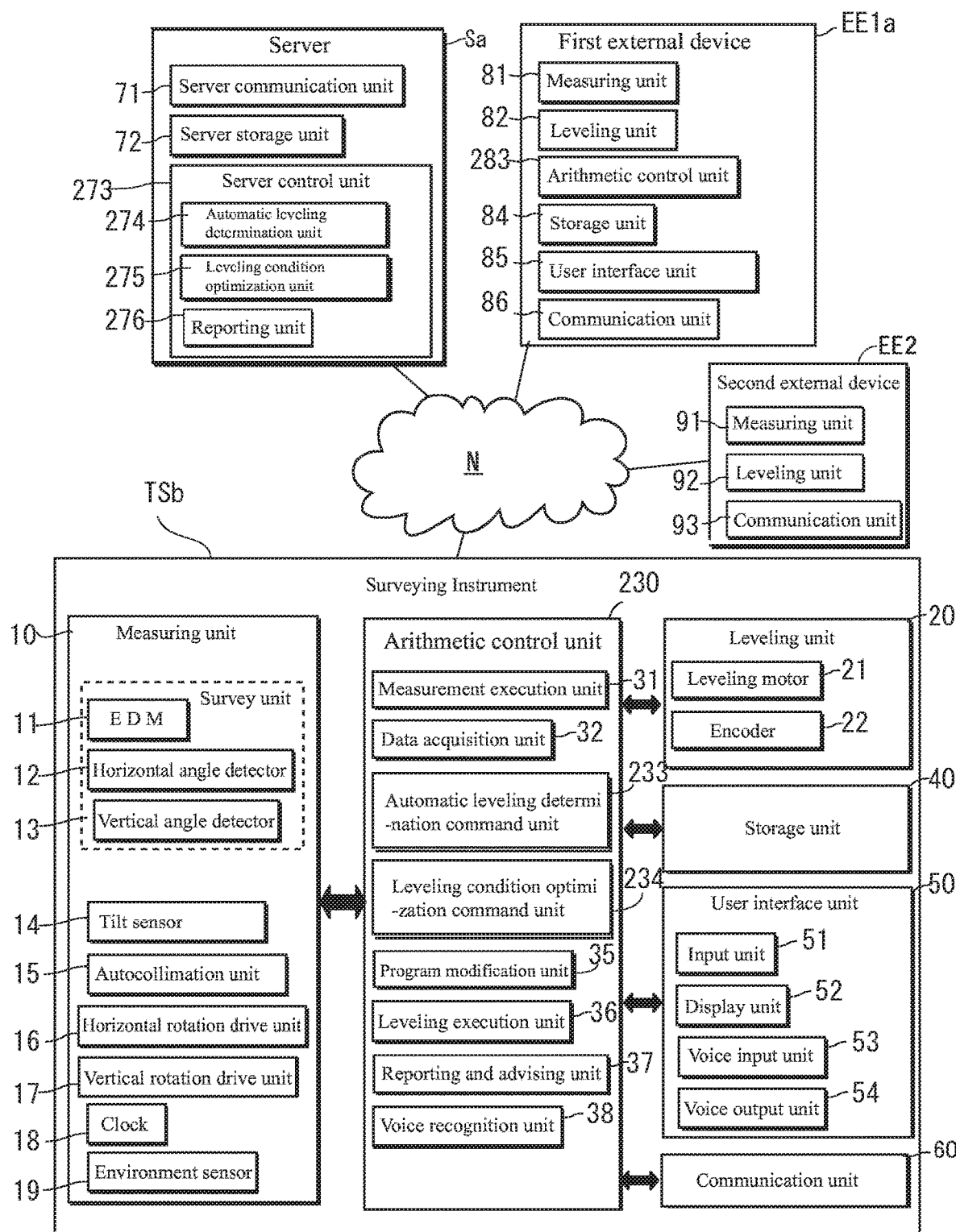
FIG. 9 is a configuration block diagram of a surveying system according to a third embodiment of the present invention.

FIG. 9 is a configuration block diagram of a surveying system 200 according to a third embodiment. As with the system 100 according to the second embodiment, the system 200 includes a surveying instrument TSb, a server Sa, a first external device EE1a, and a second external device EE2. However, the surveying instrument TSb, the server Sa, and the first external device EE1a are different in the following respects from the surveying instrument TSa, the server S, and the first external device EE1 according to the second embodiment.

The surveying instrument TSb includes, in the arithmetic control unit 230, an automatic leveling determination command unit 233 and a leveling condition optimization command unit 234 in place of the automatic leveling determination unit 33 and the leveling condition optimization unit 34.

The automatic leveling determination command unit 233 commands the server Sa to determine whether the apparatus has an automatic leveling function. The leveling condition optimization command unit 234 transmits a leveling condition optimization command to the server Sa.

A server control unit 273 of the server Sa includes, as functional units, an automatic leveling determination unit 274, a leveling condition optimization unit 275, and a reporting unit 276 in addition to the server control unit 73 of the server S. Each functional unit of the server control unit 273 is configured as software to be controlled by artificial intelligence.

The automatic leveling determination unit 274 determines whether the surveying instrument TSb has an automatic leveling function based on instrument-specific information of the surveying instrument TSb stored in the server storage unit 72.

In response to a command from the surveying instrument TSb, the leveling condition optimization unit 275 performs machine learning by using, as learning data, instrument-specific information, environment data, tilt angle data, leveling result data, and information on leveling operation conditions of each of the surveying instrument TSb, the first external device EE1a, and the second external device EE2, stored in the server storage unit 72, and generates and updates a learning model relating to optimum leveling conditions.

The leveling condition optimization unit 275 predicts optimum leveling conditions by using the learning model generated based on results of learning of the instrument-specific information, the environment data, the tilt angle data, the leveling result data, and the information on leveling operation conditions.

The reporting unit 276 reports results of the determination made by the automatic leveling determination unit 274 and results of the optimum leveling condition prediction of the leveling condition optimization unit 275, to the surveying instrument TSb.

(Automatic Modification of Program)

Figure 10:
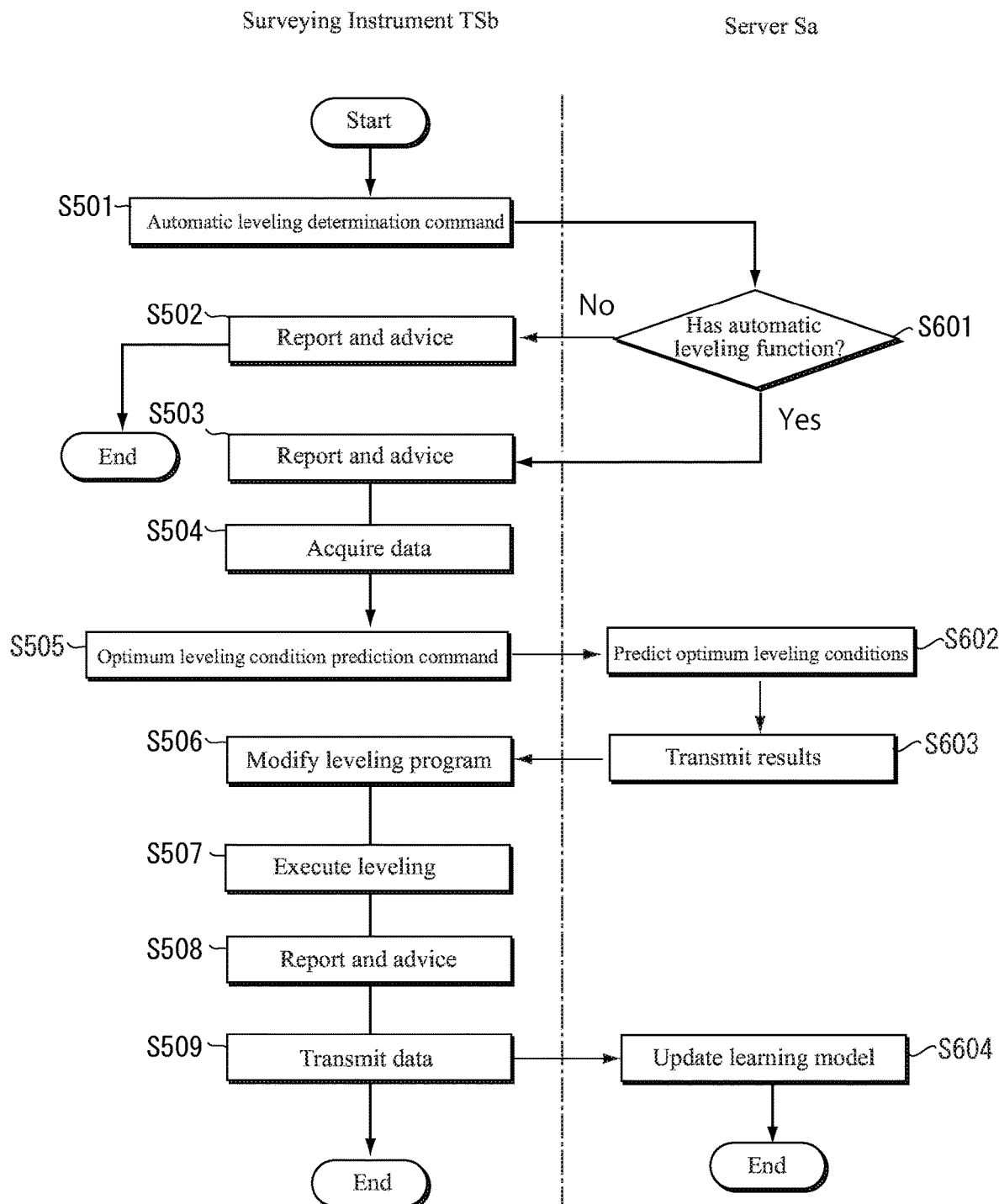
FIG. 10 is a flowchart of program automatic modification processing in the surveying system of the same embodiment.

FIG. 10 is a flowchart of processing of optimizing an automatic leveling operation by the surveying system 200.

When the processing starts, in Step S501, the data acquisition unit 32 commands the server Sa to make automatic leveling determination. Then, in Step S601, the server Sa determines whether the surveying instrument TSb has an automatic leveling function based on instrument-specific information stored in the server storage unit.

In Step S601, when the surveying instrument TSb does not have an automatic leveling function (No), the reporting unit 276 transmits the determination results to the surveying instrument TSb. In Step S502, as in Step S103, the reporting and advising unit 37 of the surveying instrument TSb creates a message based on the report from the server Sa, and outputs this message to the voice output unit 54. The voice output unit 54 outputs this message to an operator U by voice. Then, the processing ends.

On the other hand, when the surveying instrument TSb has an automatic leveling function (Yes), the reporting unit 276 transmits the determination results to the surveying instrument TSb. In Step S503, as in Step S105, the reporting and advising unit 37 of the surveying instrument TSb creates a message based on the report from the server Sa, and outputs this message to the voice output unit 54.

Next, in Step S504, for prediction of optimum leveling conditions, the data acquisition unit 32 acquires environment data by the environment sensor 19.

Next, in Step S505, the leveling condition optimization command unit 234 commands the server Sa to predict optimum leveling conditions according to the environment data and tilt angle data acquired by the data acquisition unit 32.

In Step S602, according to the command from the surveying instrument TSb, the leveling condition optimization unit 275 predicts optimum leveling conditions by using a learning model generated based on results of learning of the instrument-specific information, the environment data, leveling result data, and information on leveling operation conditions.

Next, in Step S603, the reporting unit 276 transmits results of the prediction in Step S602 to the surveying instrument TSb.

In Step S506, the program modification unit 35 modifies a leveling program based on the results of the prediction of optimum leveling conditions received from the server Sa.

Next, in Step S507, the leveling execution unit 36 executes automatic leveling according to the leveling program modified in Step S506.

When leveling is completed in Step S507, in Step S508, the reporting and advising unit 37 creates a report message and outputs this message by voice from the voice output unit 54.

Next, in Step S509, the environment data, leveling result data, and information on leveling operation conditions acquired in Steps S504 and S507 are transmitted as data of this time to the server Sa. Then, the processing of the surveying instrument TSb ends.

In the server Sa, the server storage unit 72 stores the data of this time as past data, the leveling condition optimization unit 275 modifies the learning model by using the received data of this time, and the processing ends.

In machine learning, large amounts of data are processed, however, according to the present embodiment, not the surveying instrument TSb itself but the server Sa with a higher-performance CPU is made to perform machine learning, so that a data processing speed become high.

Further, according to the present embodiment, for each leveling operation, the surveying instrument TSb transmits instrument-specific information, environment data, leveling result data, and information on leveling operation conditions to the server Sa, and the server Sa stores these as past data. Therefore, these can be used as learning data for optimization of a leveling operation in another surveying instrument such as the first external device EE1.

Further, according to the present embodiment, an updated learning model is always stored in the server Sa, so that this can be utilized as a model for optimization of a leveling operation in another surveying instrument. In addition, a development engineer can refer to and utilize the data for program development.

Although preferred embodiments of the present invention are described above, the embodiments and examples described above are just examples of the present invention, and the respective configurations can be combined based on knowledge of a person skilled in the art, and such a combined embodiment is also included in the scope of the present invention.

REFERENCE SIGNS LIST

10 Measuring unit
14 Tilt sensor
19 Environment sensor
20 Leveling unit
21 Leveling drive unit
30 Arithmetic control unit
33 Automatic leveling determination unit
34 Leveling condition optimization unit
35 Program modification unit
37 Reporting and advising unit
38 Voice recognition unit
40 Storage unit
53 Voice input unit
54 Voice output unit
60 Communication unit
71 Server communication unit
72 Server storage unit
100 Surveying system (system)
200 Surveying system (system)
230 Arithmetic control unit
233 Automatic leveling determination command unit
234 Leveling condition optimization command unit
273 Server control unit
274 Automatic leveling determination unit
275 Leveling condition optimization unit
EE1, EE1a First external device
EE2 Second external device
N Communication network
S, Sa Server
TS, TSa, TSb Surveying instrument

The invention claimed is:

1. A surveying instrument comprising:
a measuring unit including a tilt sensor configured to acquire tilt angle data of a surveying instrument main body, and an environment sensor configured to acquire environment data having a correlation with a leveling time and leveling accuracy;
a leveling unit including a leveling drive unit and configured to level the surveying instrument based on the tilt angle data;
an arithmetic control unit configured to control the measuring unit and the leveling unit; and
a storage unit configured to store the environment data, leveling result data of the leveling unit, and information on leveling operation conditions, wherein
the storage unit has surveying instrument-specific information, and
the arithmetic control unit includes
a leveling condition optimization unit configured to predict optimum leveling conditions according to environment data and the surveying instrument-specific information based on results of machine learning of optimum leveling conditions by using the environment data, the leveling result data, the information on leveling operation conditions, and the surveying instrument-specific information as learning data, and a program modification unit configured to modify a leveling program so as to realize the optimum leveling conditions.

2. The surveying instrument according to claim 1, wherein the arithmetic control unit includes an automatic leveling determination unit configured to determine whether the surveying instrument has an automatic leveling function based on the surveying instrument-specific information.

3. The surveying instrument according to claim 1, further comprising:
a voice output unit, wherein
the arithmetic control unit includes a reporting and advising unit configured to create a message for an operator, and
the voice output unit outputs a message created by the reporting and advising unit by voice.

4. The surveying instrument according to claim 2, further comprising:
a voice output unit, wherein
the arithmetic control unit includes a reporting and advising unit configured to create a message for an operator, and
the voice output unit outputs a message created by the reporting and advising unit by voice.

5. The surveying instrument according to claim 1, wherein
the arithmetic control unit includes a leveling execution unit configured to execute a leveling operation according to the leveling program, and
the reporting and advising unit is configured to report an end of a leveling operation from the voice output unit when leveling is completed by the leveling execution unit.

6. The surveying instrument according to claim 2, wherein
the arithmetic control unit includes a leveling execution unit configured to execute a leveling operation according to the leveling program, and
the reporting and advising unit is configured to report an end of a leveling operation from the voice output unit when leveling is completed by the leveling execution unit.

7. The surveying instrument according to claim 3, wherein
the arithmetic control unit includes a leveling execution unit configured to execute a leveling operation according to the leveling program, and
the reporting and advising unit is configured to report an end of a leveling operation from the voice output unit when leveling is completed by the leveling execution unit.

8. The surveying instrument according to claim 4, wherein
the arithmetic control unit includes a leveling execution unit configured to execute a leveling operation according to the leveling program, and
the reporting and advising unit is configured to report an end of a leveling operation from the voice output unit when leveling is completed by the leveling execution unit.

9. The surveying instrument according to claim 1, further comprising:
a voice input unit configured to input voice, wherein
the arithmetic control unit includes a voice recognition unit configured to recognize the voice input by a natural language processing function.

10. The surveying instrument according to claim 2, further comprising:
a voice input unit configured to input voice, wherein
the arithmetic control unit includes a voice recognition unit configured to recognize the voice input by a natural language processing function.

11. The surveying instrument according to claim 3, further comprising:
a voice input unit configured to input voice, wherein
the arithmetic control unit includes a voice recognition unit configured to recognize the voice input by a natural language processing function.

12. The surveying instrument according to claim 4, further comprising:
a voice input unit configured to input voice, wherein
the arithmetic control unit includes a voice recognition unit configured to recognize the voice input by a natural language processing function.

13. The surveying instrument according to claim 5, further comprising:
a voice input unit configured to input voice, wherein
the arithmetic control unit includes a voice recognition unit configured to recognize the voice input by a natural language processing function.

14. The surveying instrument according to claim 6, further comprising:
a voice input unit configured to input voice, wherein
the arithmetic control unit includes a voice recognition unit configured to recognize the voice input by a natural language processing function.

15. The surveying instrument according to claim 7, further comprising:
a voice input unit configured to input voice, wherein
the arithmetic control unit includes a voice recognition unit configured to recognize the voice input by a natural language processing function.

16. The surveying instrument according to claim 8, further comprising:
a voice input unit configured to input voice, wherein
the arithmetic control unit includes a voice recognition unit configured to recognize the voice input by a natural language processing function.

17. A surveying system comprising:
the surveying instrument according to claim 1 further including a communication unit that enables communication externally via a communication network;
a server configured to enable communication with the surveying instrument; and
at least one first external device having the same configuration as the surveying instrument and enabling communication with the server via the communication network, wherein
the server includes a server storage unit configured to store environment data, leveling result data, and information on leveling operation conditions acquired in the past by the surveying instrument and the first external device, and surveying instrument-specific information, and
the leveling condition optimization unit is configured to predict optimum leveling conditions according to environment data acquired by the environment sensor and surveying instrument-specific information received from the server based on results of machine learning of optimum leveling conditions by using environment data, leveling result data, information on leveling operation conditions, and surveying instrument-specific information, received from the server, as learning data.

18. A surveying system comprising:

a surveying instrument that includes a measuring unit including a tilt sensor configured to acquire tilt angle data of a surveying instrument main body, and an environment sensor configured to acquire environment data having a correlation with a leveling time and leveling accuracy, a leveling unit including a leveling drive unit and configured to level the surveying instrument based on the tilt angle data, an arithmetic control unit configured to control the measuring unit and the leveling unit, and a communication unit that enables communication externally via a communication network;

a server that includes a server communication unit enabling communication with the surveying instrument, a server storage unit configured to receive measurement data from the surveying instrument and store the measurement data, and a server control unit configured to control the server; and at least one first external device having the same configuration as the surveying instrument and enabling communication with the server via the communication network, wherein the arithmetic control unit includes a leveling condition optimization command unit configured to command the server to predict optimum leveling conditions, the server control unit includes a leveling condition optimization unit configured to predict optimum leveling conditions according to environment data and the surveying instrument-specific information based on results of machine learning of optimum leveling conditions by using the environment data, the leveling result data, the information on leveling operation conditions, and surveying instrument-specific information relating to the surveying instrument and the first external device, stored in the server storage unit, as learning data, and the arithmetic control unit includes a program modification unit configured to modify a leveling program so as to realize the optimum leveling conditions.

19. The surveying system according to claim 18, comprising:

at least one second external device including at least an environment sensor and a communication unit, wherein measured data measured by the second external device is transmitted to the server, the server is configured to sequentially store data received from the second external device in the server storage unit, and the leveling condition optimization unit is configured to use measured data of the second external device as learning data for the machine learning.

20. The surveying system according to claim 19, comprising:

at least one second external device including at least an environment sensor and a communication unit, wherein measured data measured by the second external device is transmitted to the server, the server is configured to sequentially store data received from the second external device in the server storage unit, and the leveling condition optimization unit is configured to use measured data of the second external device as learning data for the machine learning.

* * * * *